United States Patent [19]

Haberkorn

[11] Patent Number: 4,497,093
[45] Date of Patent: Feb. 5, 1985

[54] TWO-PART FASTENER

[76] Inventor: Jerome R. Haberkorn, 316 Arnold Ave., East Peoria, Ill. 61611

[21] Appl. No.: 453,630

[22] Filed: Dec. 27, 1982

[51] Int. Cl.³ .............................................. A44B 17/00
[52] U.S. Cl. ........................................ 24/586; 24/615; 24/686; 24/697; 108/159; 312/140.3; 312/195; 403/11; 403/231; 403/407
[58] Field of Search .................. 24/697, 686, 615, 586; 108/159, 11, 71, 70; 403/407, 231; 248/188; 312/140.3, 195, 71, 70

[56] References Cited

U.S. PATENT DOCUMENTS

| | | | |
|---|---|---|---|
| 3,490,797 | 1/1970 | Platte | 403/407 X |
| 4,277,120 | 7/1981 | Drake et al. | 312/320 |
| 4,353,663 | 10/1982 | Glickman | 403/407 X |
| 4,406,033 | 9/1983 | Chisholm et al. | 24/615 X |

Primary Examiner—Philip C. Kannan
Attorney, Agent, or Firm—Senniger, Powers, Leavitt and Roedel

[57] ABSTRACT

A two-part fastener for fastening two objects together comprising a first fastener part mounted on one of the objects and a second fastener part mounted on the other object. The first fastener part has a plurality of openings therein and the second fastener part has a contractible and expansible locking member which is inserted through one of the openings for fastening the two fastener parts together. The locking member is independently movable with respect to the object upon which the second fastener part is mounted. This enables the locking member to freely move to a position in which it is aligned with an opening in the first fastener part for insertion therethrough.

20 Claims, 4 Drawing Figures

U.S. Patent  Feb. 5, 1985  4,497,093
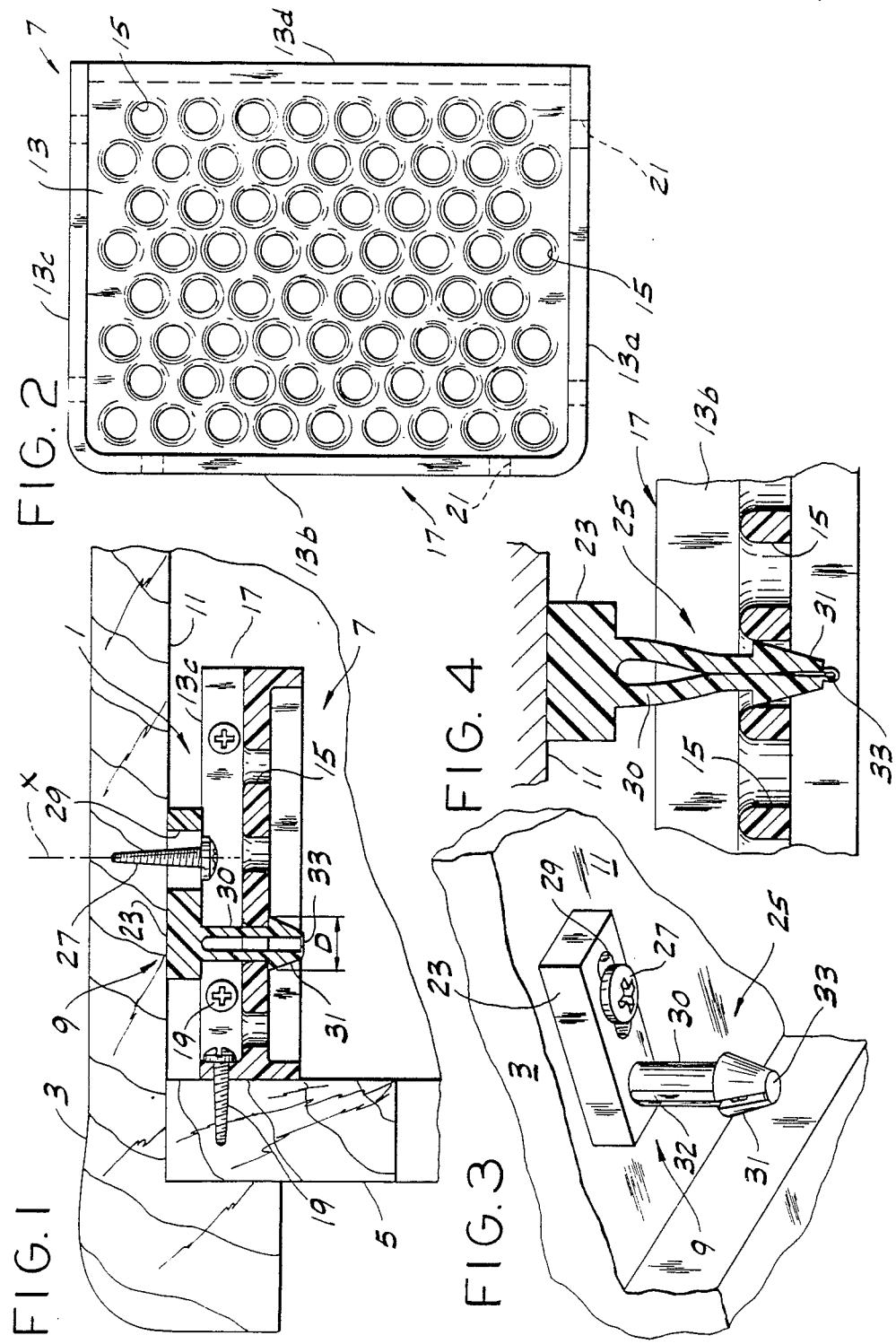

TWO-PART FASTENER

BACKGROUND OF THE INVENTION

This invention relates generally to fasteners, and more particularly to a two-part fastener for releasably fastening two objects together.

A fastener of this invention is especially (albeit not exclusively) suited for fastening a cabinet top to a cabinet frame. Heretofore, screws have typically been used for this purpose. However, such fasteners are very difficult to install when there is only a limited amount of working space. In addition, such fasteners make it difficult to remove the cabinet top from the cabinet frame for replacement or repair.

SUMMARY OF THE INVENTION

Among the several objects of this invention may be noted the provision of an improved fastener for releasably fastening two objects together, such as a cabinet top and a cabinet frame; the provision of such a fastener which enables one blindly to fasten a cabinet top, for example, to a cabinet frame; the provision of such a fastener which is simple and convenient to use; and the provision of such a fastener which provides for easy removal of the cabinet top from the cabinet frame.

In general, this invention involves a two-part fastener comprising first and second fastener parts for fastening two objects together. The first fastener part is in the form of a bracket, has a plurality of relatively closely spaced openings therein, and is designed to be mounted on one of the objects. The second fastener part is designed to be mounted on the other object and has a contractible and expansible locking member thereon. This locking member is designed to contract for insertion through an opening in the bracket and to expand after insertion through the opening for fastening the two fastener parts together. The locking member is independently movable with respect to the other object when the second fastener part is mounted thereon. This enables the locking member to move without substantial movement of the other object to a position in which the locking member is aligned with an opening in the bracket. The locking member can then be inserted therethrough thus fastening the two objects together.

Other objects and features will be in part apparent and in part pointed out hereinafter.

BRIEF DESCRIPTION OF THE DRAWINGS

FIG. 1 is a sectional view of a two-part fastener of the present invention securing a counter top to a cabinet frame;

FIG. 2 is a top plan of one fastener part of the fastener;

FIG. 3 is a perspective view of a second fastener part mounted on the bottom of the counter top; and FIG. 4 is an enlarged sectional view showing one fastener part contracting as it passes through a hole in the other fastener part.

Corresponding reference characters indicate corresponding parts throughout the several views of the drawings.

DESCRIPTION OF THE PREFERRED EMBODIMENT

Referring now to FIG. 1 of the drawings, there is generally indicated at 1 a two-part fastener for releasably fastening a counter top 3 in a generally horizontal position to a cabinet frame 5. The fastener 1 comprises a first fastener part 7 in the form of a bracket which is mounted in a generally horizontal position to an inner corner of the cabinet frame 5, and a second fastener part 9 which is mounted on the bottom face 11 of the counter top 3 near the corner corresponding to the aforementioned corner of the cabinet frame.

As illustrated in FIG. 2, the bracket 7 is generally rectangular in shape and comprises a web member 13 having a plurality of relatively closely spaced openings or holes 15 therein. The web member 13 is relatively thin (e.g., 0.188 inch), substantially planar, and has a flange 17 (constituting flange means) at its periphery for strengthening the web member and providing means for mounting the bracket 7 on the cabinet frame 5. The flange 17 projects vertically beyond the upper and lower faces of the web member on three sides 13a, 13b and 13c of the web member but only beyond the lower face of the web member on the fourth side 13d thereof. Fasteners 19 extend through openings 21 in the upper portion of the flange 17 for mounting the bracket 7 on the cabinet frame 5. The bracket is preferably of one-piece molded construction and may be of any suitable synthetic resin material (e.g., polypropylene).

The holes 15 in the web member 13 of the bracket are circular in shape and extend completely through the web member from its top to its bottom surface. They are arranged in substantially parallel relatively closely spaced rows (see FIG. 2), with the holes 15 in each row being staggered relative to the holes in the rows adjacent thereto. Other configurations may also be suitable so long as the holes are closely spaced. For reasons which become apparent hereinafter, the holes are chamfered (rounded) at their upper ends, as illustrated in FIGS. 1 and 4, to minimize the amount of flat surface area between the holes atop the web member.

As shown in FIG. 3, the second fastener part 9 of the two-part fastener 1 comprises a relatively thin rectangular pivot arm 23 extending in a horizontal plane generally parallel to the bottom face 11 of the counter top 3, and a locking member in the form of a toggle pin 25 which projects downwardly from one end of the arm for insertion through a hole 15 in the web member 13. The fastener part 9 is mounted on the bottom face 11 of the counter top 3 by means of a fastener 27 (e.g., a wood screw) which extends up through an elongate opening or slot 29 extending lengthwise of the pivot arm 23. The arrangement is such that the pivot arm 23 may pivot on the fastener 27, the axis X of which is generally perpendicular to the the bottom face of the counter top. The slot 29 enables the pivot arm to move endwise (i.e., in the direction of its length) relative to screw 27. The pivot arm 23 and toggle pin 25 are also preferably integrally molded from a suitable synthetic resin material such as polypropylene.

The toggle pin 25 on the pivot arm 23 extends generally perpendicularly with respect to the arm in a direction generally parallel to pivot axis X. It is of resilient material (e.g., polypropylene) and comprises a shank 30 having an enlarged conical head 31 at its outer (lower) end. The diameter of the shank 30 should be approximately the same as the diameter of the holes 15 (e.g., 0.250 inch). The maximum diameter D of the head 31 (e.g., 0.375 inch) is greater than the diameter of the holes 15 in the web member of the bracket. As indicated at 32, the shank 30 and head 31 are split along the length of the pin. The split 32 is sufficiently wide (e.g., 0.125 inch) to enable the head of the pin to contract to a diameter which is small enough to permit passage through a hole 15 in the web member 13, (see FIG. 4), the head being adapted to expand (spring) back to its original shape after insertion for preventing unintentional withdrawal of the head back through the hole thereby releasably to fasten the counter top to the cabinet frame (FIG. 1). The fact that the head 29 of the pin is tapered toward its lower end facilitates insertion of the pin into a hole 15 in the web member 13. A thin flexible membrane 33 at the lower end of the head (and preferably integrally molded therewith) spans the split and limits the expansibility of the pin.

To use the two-part fastener 1 for fastening counter top 3, for example, to cabinet frame 5, the bracket 7 is mounted in an inner corner of the cabinet frame 5 near the top thereof and the second fastener part 9 is mounted on the bottom face 11 of the counter top 3 near the corner corresponding to the corner of the cabinet frame. The counter top 3 is then placed in the desired position over the cabinet frame 5. If the pin 25 is in direct alignment with one of the holes 15 in the web member 13 as the counter top is lowered into position, the tapered head 31 of the pin will enter the hole and contract for enabling passage through the hole. If the pin is not in direct alignment with a hole, the head of the pin will most likely contact the chamfered surface at the upper end of one hole which will cause the pivot arm 23 to pivot and/or move endwise relative to screw 27 as the head is guided by the chamfered surface into direct alignment with the hole for passage therethrough. If by chance the head of the toggle pin should initially engage a small flat area between holes 15, only a very slight movement of the counter top relative to the base should be sufficient to cause the pivot arm and pin to move to seek out and pass through an appropriate opening.

As noted, the head 31 of the toggle pin contracts to enable it to pass through a hole 15, and expands back to its original unstressed shape once through the opening thereby to fasten the counter top to the cabinet frame. To minimize any unintended upward movement of the top relative to the frame, the bracket 7 should be secured to the frame at an elevation which will provide for a reasonably close fit of the head against the underside of the web member 13 of the bracket. The fact that the flange 17 on the bracket does not project up above the web member at the right side 13d of the bracket (as viewed in FIG. 1) is advantageous in that this reduces the amount of possible interference of the toggle pin with the flange. In order to unfasten the counter top 3 from the cabinet frame 5, one merely has to squeeze the tapered head 31 of the toggle pin to permit passage of the head back up through hole 15 and then lift the counter top off the cabinet frame.

While a two-part fastener of this invention is particularly suited for securing counter tops to cabinet frames, it will be understood that it is not limited to such use and could be used to secure any two objects together.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A two-part fastener for fastening two objects together comprising a first fastener part in the form of a bracket having a plurality of relatively closely spaced openings therein adapted to be mounted on one of the objects, and a second fastener part adapted to be mounted on the other of the objects, said second fastener part having a contractible and expansible locking member thereon adapted to contract for insertion of the member through an opening in the bracket and to expand after insertion through said opening for fastening the two fastener parts together, said locking member being independently movable with respect to said other object when the second fastener part is mounted thereon for enabling the locking member to move without substantial movement of said other object to a position in which the locking member is aligned with an opening in the bracket for insertion therethrough thereby to fasten said two objects together.

2. A two-part fastener as set forth in claim 1 wherein said openings are chamfered for guiding said locking member into said openings.

3. A two-part fastener as set forth in claim 1 wherein said openings are arrayed in a plurality of substantially parallel relatively closely spaced rows, the openings in each row being staggered relative to the openings in the rows adjacent thereto.

4. A two-part fastener as set forth in claim 1 further comprising means for mounting said second fastener part for pivotal movement with respect to said other object.

5. A two-part fastener as set forth in claim 4 wherein said second fastener part comprises a pivot arm having said locking member thereon, said mounting means comprising a fastener adapted to extend through an opening in the pivot arm into said other object, said pivot arm being adapted to pivot on said fastener.

6. A two-part fastener as set forth in claim 5 wherein said opening in said pivot arm is a slot extending lengthwise of said pivot arm for permitting endwise movement of the pivot arm relative to said fastener.

7. A two-part fastener as set forth in claim 5 wherein said locking member comprises a toggle pin on the pivot arm extending generally perpendicularly with respect to the arm in a direction generally parallel to the pivot axis of the pivot arm.

8. A two-part fastener as set forth in claim 7 wherein said toggle pin is of resilient material and comprises a shank having an enlarged head at its outer end, the maximum diameter of the head being greater than the diameter of an opening in said bracket, said shank and head being split along the length of the pin for enabling contraction of the head to a diameter which is sufficiently small to permit passage of the head through said opening.

9. A two-part fastener as set forth in claim 8 wherein said head is tapered for facilitating insertion of the pin into an opening in said bracket.

10. A two-part fastener as set forth in claim 1 wherein said bracket comprises a relatively thin substantially planar web member having said holes therethrough, and flange means at the periphery of the web member for mounting said bracket on said object.

11. A two-part fastener as set forth in claim 10 further comprising a plurality of fasteners adapted to extend through openings in said flange means for mounting the bracket on said object.

12. A two-part fastener as set forth in claim 11 wherein said bracket is adapted to be mounted with said web member generally horizontal, said bracket being generally rectangular in shape and said flange means comprising a generally vertical flange around the periphery of the web member, said flange projecting vertically beyond the upper and lower faces of the web member on three sides of the web member but only beyond the lower face of the web member on the fourth side thereof, the portion of said flange above said web member on said three sides thereof having said openings therein.

13. A two-part fastener for releasably fastening a counter top in a generally horizontal position to a cabinet frame, said fastener comprising a first fastener part in the form of a bracket having a web member with a plurality of relatively closely spaced openings therein, means for mounting the web member on the cabinet frame in a generally horizontal position, and a second fastener part comprising an expansible and contractible locking member adapted to be mounted on the bottom of the counter top, said locking member being adapted to contract for insertion of the member through an opening in the bracket and to expand after insertion through said opening for preventing unintentional withdrawal of the locking member from the opening thereby releasably to fasten the counter top to the cabinet frame, said locking member being contractible for withdrawal of the locking member from the opening thereby to permit removal of the top from the frame.

14. A two-part fastener as set forth in claim 13 wherein the head of the toggle pin is tapered and said holes are chamfered for guiding the head of the pin into said openings.

15. A two-part fastener as set forth in claim 13 wherein said bracket is generally rectangular in shape and further comprises a generally vertical flange around the periphery of said web member, said flange projecting vertically beyond the upper and lower faces of the web member on three sides of the web member but only beyond the lower face of the web member on the fourth side thereof, the portion of said flange above said web member on said three sides thereof having openings therein to receive fasteners for mounting the bracket on the cabinet frame.

16. A two-part fastener as set forth in claim 13 further comprising means for mounting said second fastener part for pivotal movement with respect to the cabinet top about an axis generally perpendicular to the bottom of the cabinet top.

17. A two-part fastener as set forth in claim 16 wherein said second fastener part comprises a pivot arm having said locking member thereon, said mounting means comprising a fastener adapted to extend through an opening in the pivot arm into said counter top, said pivot arm being adapted to pivot on said fastener.

18. A two-part fastener as set forth in claim 17 wherein said opening in said pivot arm is a slot extending lengthwise of the pivot arm for permitting endwise movement of the pivot arm relative to the fastener.

19. A two-part fastener as set forth in claim 18 wherein said locking member comprises a toggle pin on tne pivot arm extending generally perpendicularly with respect to the arm in a direction generally parallel to the pivot axis of the pivot arm.

20. A two-part fastener as set forth in claim 19 wherein said toggle pin is of resilient material and comprises a shank having an enlarged head at its outer end, the maximum diameter of the head being greater than the diameter of an opening in said bracket, said shank and head being split along the length of the pin for enabling contraction of the head to a diameter which is sufficiently small to permit passage of the head through said opening.

* * * * *